(12) United States Patent
Malay

(10) Patent No.: US 6,183,902 B1
(45) Date of Patent: *Feb. 6, 2001

(54) BEADED ELECTRODE CUP FOR A MINIATURE GALVANIC CELL

(75) Inventor: Manuel Rafols Malay, Brunswick, OH (US)

(73) Assignee: Eveready Battery Company, Inc., St. Louis, MO (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/092,832

(22) Filed: Jun. 5, 1998

(51) Int. Cl.[7] .............................. H01M 10/04; H01M 2/02
(52) U.S. Cl. ................................................ 429/166; 429/164
(58) Field of Search ...................................... 429/176, 101, 429/53, 206, 166, 164, 56

(56) References Cited

U.S. PATENT DOCUMENTS

| | | | |
|---|---|---|---|
| 3,909,303 | 9/1975 | Rosansky et al. | 136/177 |
| 4,207,385 | 6/1980 | Hayama | 429/56 |
| 4,240,197 | 12/1980 | Hamsag | 29/623.2 |
| 4,302,517 | 11/1981 | Dziak . | |
| 4,640,874 * | 2/1987 | Kelm | 429/27 |
| 4,959,280 * | 9/1990 | Amthor | 429/97 |
| 5,156,930 * | 10/1992 | Daio | 429/53 |
| 5,376,480 * | 12/1994 | Dhinoda | 429/206 |
| 5,462,820 * | 10/1995 | Tanaka | 429/174 |
| 5,641,367 * | 6/1997 | Tatsumi | 156/69 |
| 5,846,672 | 12/1998 | Bennett | 429/164 |

FOREIGN PATENT DOCUMENTS

| | | | |
|---|---|---|---|
| 59-160953 | 9/1984 | (JP) | H01M/2/08 |
| 60-241641 | 11/1985 | (JP) . | |
| 1-175168 | 7/1989 | (JP) . | |
| 3-226970 | 10/1991 | (JP) . | |
| 8-106910 | 4/1996 | (JP) . | |

* cited by examiner

Primary Examiner—Stephen Kalafut
Assistant Examiner—Mark Ruthkosky
(74) Attorney, Agent, or Firm—Russell H. Toye, Jr.

(57) ABSTRACT

A miniature galvanic cell employing a cell housing comprising a beaded cup, wherein the bead is disposed at the vicinity of the open end of the cup, and a low profile can and gasket assembly are used so that effectively the majority of the cross-section thickness of the vertical portion of the cell is attributed to only the thickness of the wall of the cup so that maximum internal volume of the cell is reserved for the active components. A process for producing the novel housing is also disclosed.

19 Claims, 3 Drawing Sheets

BEADED ELECTRODE CUP FOR A MINIATURE GALVANIC CELL

FIELD OF THE INVENTION

This invention relates to a galvanic cell employing an inward beaded contour cup and a can assembly that occupies a relatively small volume so that the internal volume of this cell is reserved primarily for the active components of the cell. This invention also relates to a process for producing a galvanic cell employing an inward beaded contour cup and having optimum internal volume for the active components of the cell.

BACKGROUND OF THE INVENTION

The miniaturization of electronic devices has created a demand for small but powerful electrochemical cells. Cells that utilize an alkaline electrolyte are known to provide high energy density per unit volume, and are therefore well suited for applications in miniature electronic devices such as hearing aids, cameras, watches and calculators. However, alkaline electrolytes, such as aqueous potassium hydroxide and sodium hydroxide solutions, have an affinity for wetting metal surfaces and are known to creep through the sealed metal interface of an electrochemical cell. Leakage in this manner can deplete the electrolyte solution from the cell and can also cause a corrosive deposit on the surface of the cell that detracts from the cell's appearance and marketability. These corrosive salts may also damage the device in which the cell is housed. Typical cell systems where this problem is encountered include silver oxide-zinc cells, nickel-cadmium cells, air depolarized cells, and alkaline-manganese dioxide cells.

In the prior art it has been a conventional practice to incorporate insulating gaskets between the cell's cup and can so as to provide a seal for the cell. Generally, the gasket must be made of a material inert to the electrolyte contained in the cell and the cell environment. In addition, it must be flexible and resistant to cold flow under pressure of the seal and maintain these characteristics so as to insure a proper seal during long periods of storage. Material such as nylon, polypropylene, ethylene-tetrafluoroethylene copolymer and high density polyethylene have been found to be suitable as gasket materials for most applications. Typically, the insulating gasket is in the form of a "J" shaped configuration in which the extended wall of the cup is inserted so that upon being radially squeezed, a flange of the gasket forms a seal with the bottom portion of the wall of the cup. The gasket generally extends the entire length of the internal wall of the cell. The volume of the gasket could exceed as much as 20% of the internal volume of the cell and therefore results in a waste of space in the cell for the active components of the cell. To better insure a good seal, a sealant is generally applied to the gasket, including its "U" shaped groove, so that upon insertion of the cup into the gasket, the edge of the extended wall of the cup will seat in the sealant and then upon the application of a compressive force, the wall of the gasket will be compressed against the edge of the extended cup wall.

U.S. Pat. No. 4,302,517 discloses a sealed galvanic cell employing an insulating gasket between the can and the cup of the cell. The cell is composed of a first sealing segment disposed and compressed between the rim of the can and the edge of the cup and a second can support segment extending within the cup and substantially parallel to the wall of the cup and defining a plurality of spaced apart openings which accommodate the cell's electrolyte and/or the cell's reaction product.

It is an object of the present invention to provide a cell structure that employs an inward beaded contour cup and a can housing that occupies a minimum internal volume for the cell.

It is another object of the present invention to provide an inward beaded contour cup and a can housing for a cylindrical cell that uses a low profile gasket disposed between the cup and can to electrically insulate the cup from the can and to provide a seal for the cell so that the cell has a large internal volume for its active components.

It is another object of the present invention to provide a novel inward beaded contour cup and a can housing for a cell that is easy to make, cost effective to produce and easy to assemble.

It is another object of the present invention to provide a process for producing a cell with a novel inward beaded contour cup and a can housing occupying a minimum volume for the cell.

The foregoing and additional objects of the present invention will become more fully apparent from the following description and drawings.

DESCRIPTION OF THE INVENTION

One aspect of the invention relates to a galvanic cell comprising a first electrode having a polarity; a second electrode of opposite polarity; a separator between said first electrode and said second electrode; an electrolyte; a two-part conductive housing containing said first electrode, said second electrode, said separator and said electrolyte, the first part of said housing being a can electrically connected to said first electrode and having a wall and an edge defining an opening, and the second part of said housing being a cup electrically connected to said second electrode and having an upstanding wall with an outer surface and an edge end defining an opening and having an inward beaded area at the vicinity of the open end of the cup, and an insulating gasket comprising a base member having at least one upstanding wall, preferably an outer wall and an inner wall spaced apart from the outer wall thereby defining a "U" shaped groove; wherein the edge of the can's wall is disposed against said gasket, preferably within the groove of said gasket; one upstanding wall of said gasket is disposed between the wall of the can and the wall of the cup; and the base member of said gasket is seated on the beaded area of the cup producing a sealed galvanic cell.

Preferably, the beaded area of the cup's wall is composed of a portion of the cup's wall folded upon itself. The beaded area is disposed at the vicinity of the open end of the cup and provides a support for the low profile gasket during sealing of the cell. The inner wall of the gasket is seated on the peripheral area of the separator of the cell to secure the first electrode within the can of the cell. Another embodiment of the invention would entail the use of a ring or similar component between the inner wall of the gasket and the separator so that the inner wall of the gasket would be seated on the separator via the ring or other type of component, preferably a firm component.

In the conventional cell construction, an electrode dome is seen as a problem. The electrode dome reduces the internal volume in the anode compartment and also could cause delamination or breakage of the protective membrane which could result in leakage. The electrode dome is the result of the electrode compression at the circumferencial edge of the electrode caused by the compression of the gasket. The electrode dome can be effectively eliminated by controlling the material flex direction. Thus a mechanism should be made that will set the flex direction and also provide room to accommodate the deflection. The flex direction can be controlled by simply blanking an oversize disc electrode to fit the cathode can. The effect will be similar to the use of a wedge type masher. The wedging of the electrode also will provide excellent electrical contact of the metallic screen with the cathode can. To accommodate the electrode, the cathode can may contain a shallow outward embossment as shown on FIG. 6. The embossed can also serves as a controlled gap for uniform air diffusion across the surface of the electrode membrane.

As shown in FIG. 5, the vertical height B from the open end of the cup to the beaded contour should preferably be located between 5% and 40% of the vertical length A of the upstanding wall of the cup measured from the open end of the cup, more preferably located between 8% and 30% of the vertical length of the upstanding wall and most preferably located between 10% and 25% of the vertical length of the upstanding wall of the cup.

The can of the housing of the present invention has an upstanding peripheral wall that is much smaller in height than the conventional upstanding peripheral wall of cans of cells of the prior art. In conventional types of miniature galvanic cells, the height of the upstanding peripheral wall of the gasket usually extends the entire height of the can's upstanding peripheral wall. This type of conventional housing for miniature galvanic cells requires that the thickness of the assembled housing includes a three-wall assembly: (1) can wall, (2) gasket wall and (3) cup wall. The internal volume for the conventional type housing for a fixed size cell is reduced by the thickness of the three-wall assembly. This results in a waste of space in the cell for active components of the cell. Contrary to this type of conventional miniature galvanic cell, the novel housing for miniature cells of the present invention, as illustrated in FIG. 6, preferably employs a beaded cup, a low profile gasket and a low profile can housing that provides only a single wall thickness (the cup's upstanding wall) for the vertical component of the housing, and thereby the internal volume of the housing is maximized to accommodate more of the active materials of the cell. Specifically, the beaded area of the cup is disposed at the vicinity of the open end of the cup so that the majority of the height of the upstanding peripheral wall of the cup is disposed above the beaded area so that the cross-sectional thickness of the housing is substantially composed only of the thickness of the wall of the cup.

Another aspect of this invention is a process for assembling the components of a cell into a two-part conductive housing in which one part is a cup and the other part is a can, comprising the steps:

a) forming a cup having a base member and peripheral wall defining an opening from a conductive sheet of material;

b) reforming the cup of step a) to reverse a portion of the peripheral wall at the opening upon itself to produce a two member first segment;

c) reforming and reversing the base of the cup of step b) to reverse a portion of the peripheral wall extending from the first segment upon itself to produce a three member second segment;

d) forming an internal bead on the wall of the cup comprising two members of the second segment disposed perpendicular to the peripheral wall and the third member of the second segment being the portion of the wall defining the opening and disposed parallel to the peripheral wall;

e) preparing an electrically insulating gasket, such as an insulating gasket with a base member having an inner upstanding wall and an outer upstanding wall, said walls being spaced apart to define a "U" shaped groove;

f) preparing a conductive can with a peripheral wall having an edge defining an opening for the can;

g) placing the components of the cell within the cup and the can and then placing the can into the cup so that the wall of the can is in parallel alignment with the wall of the cup, the gasket is disposed in physical contact between the wall of the cup and the wall of the can, and the gasket is seated on the internal bead of the wall of the cup; and h) securing the cup, the gasket and the can so as to effectively seal the cell and thereby electrically insulate the can from the cup.

The novel housing geometries of this invention accomplish two important benefits. First, the removal of the upstanding wall of the can and outer wall of the gasket above the indented area allows the negative cup compartment to be expanded without increasing the outer diameter of the cell. Second, by locating the seal closer to the gasket and positive electrode, the seal will be a stronger seal.

In some applications, a conductive label may be required to provide an electrical contact point at the side of the cell. This feature can be accomplished by utilizing a film having an electrically insulating adhesive inner layer adapted to be secured to the negative cup wall. The outer layer would be an electrically conductive surface that would provide electrical contact to the can of the cell and therefore the side of the cell would serve as the terminal of the can or positive terminal.

The gasket of this invention comprises a material selected with consideration given to its stability in the presence of the electrolyte, its resiliency, and its resistance to cold flow. Suitable polymeric materials include nylon, polytetrafluoroethylene, fluorinated ethylene-propylene, chlorotrifluoroethylene, perfluoro-alkoxy polymer, polyvinyls, polyethylene, polypropylene, polystyrene and the like. Other suitable materials would be recognizable by one skilled in the art. In some applications, additional precautions can be used in conjunction with the gasket of this invention to provide a more effective seal, such as coating selected areas of the gasket with a sealing agent such as a fatty polyamide resin or asphalt.

BRIEF DESCRIPTION OF THE DRAWINGS

The present invention will become apparent from the following description thereof when considered together with the accompanying drawings which are set forth above as being exemplary of embodiments of the present invention and are not intended, in any way, to be limitative thereof and wherein.

DETAILED DESCRIPTION OF THE DRAWINGS

Figure 1:
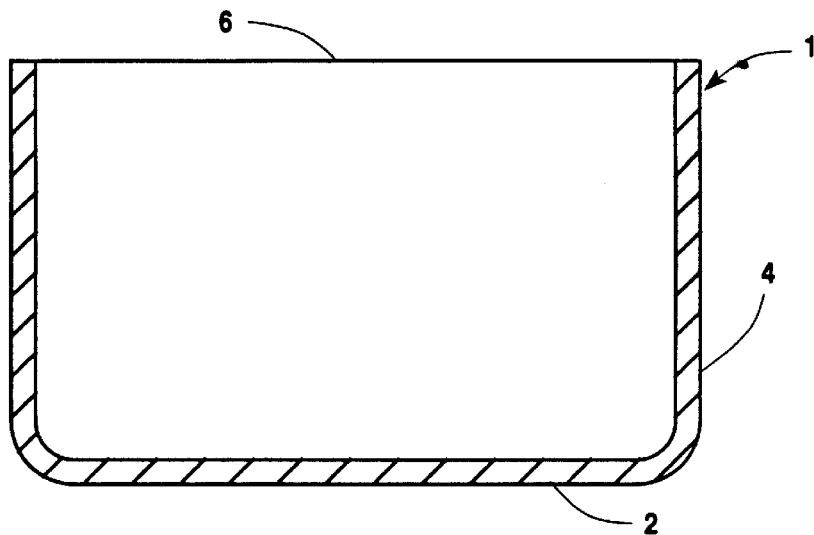
FIG. 1 is a cross-sectional view of a negative cup for use in an air depolarized cell.
Figure 2:
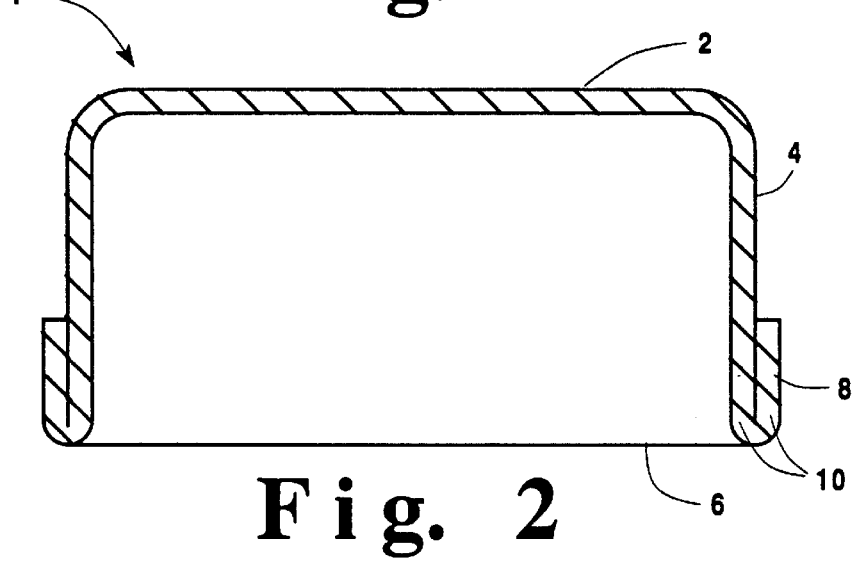
FIG. 2 is a cross-sectional view of the modification of the cup shown in FIG. 1.
Figure 3:
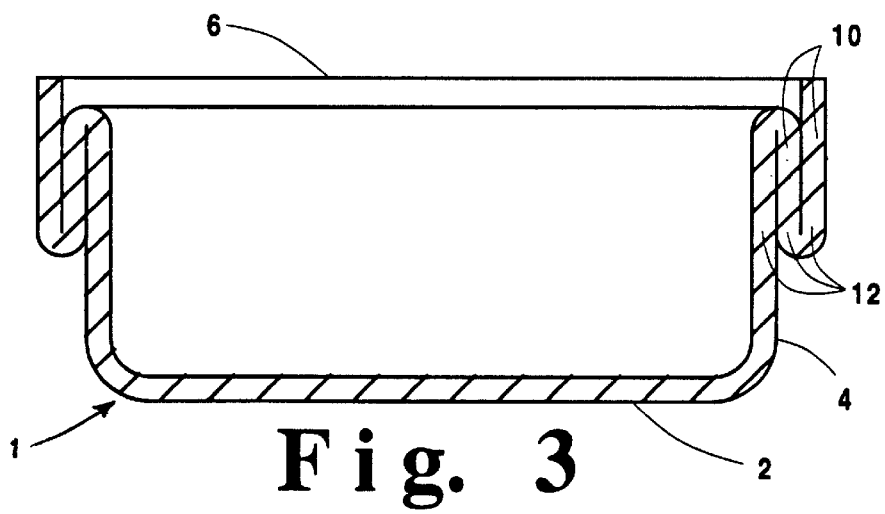
FIG. 3 is a cross-sectional view of the modification of the cup shown in FIG. 2.
Figure 4:
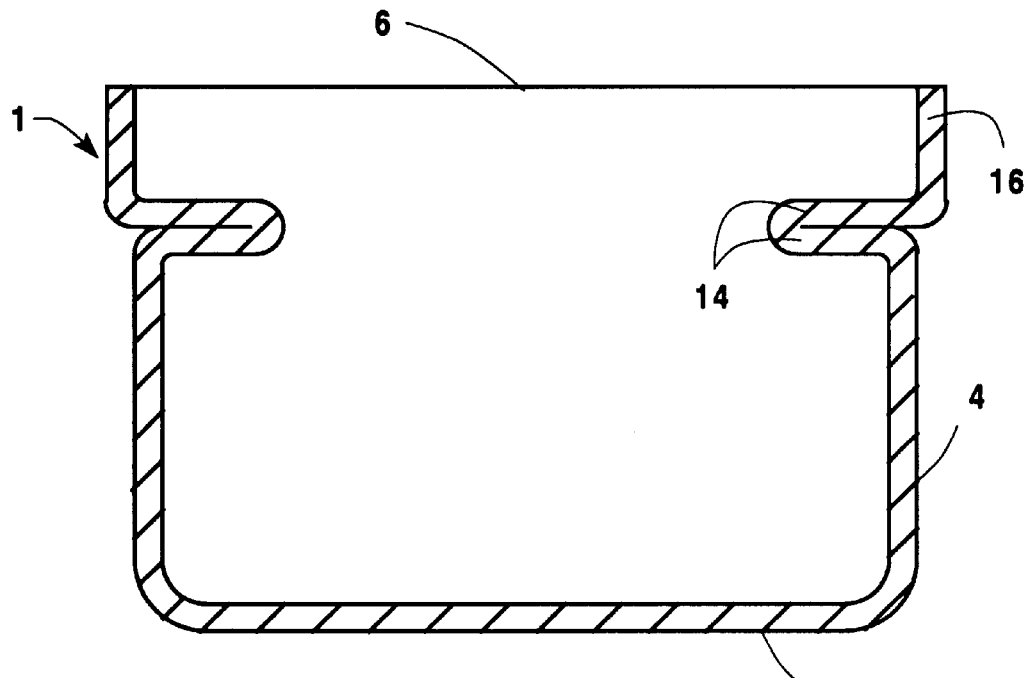
FIG. 4 is a cross-sectional view of the modification of the cup shown in FIG. 3.
Figure 5:
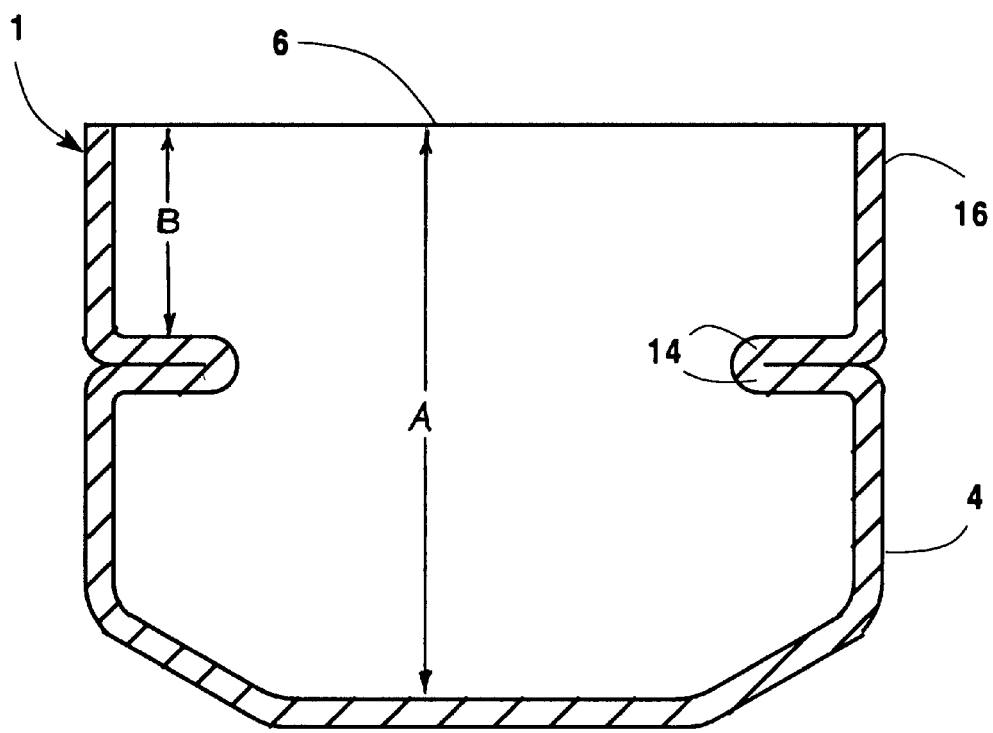
FIG. 5 is a cross-sectional view of the modification of the cup shown in FIG. 4.
Figure 6:
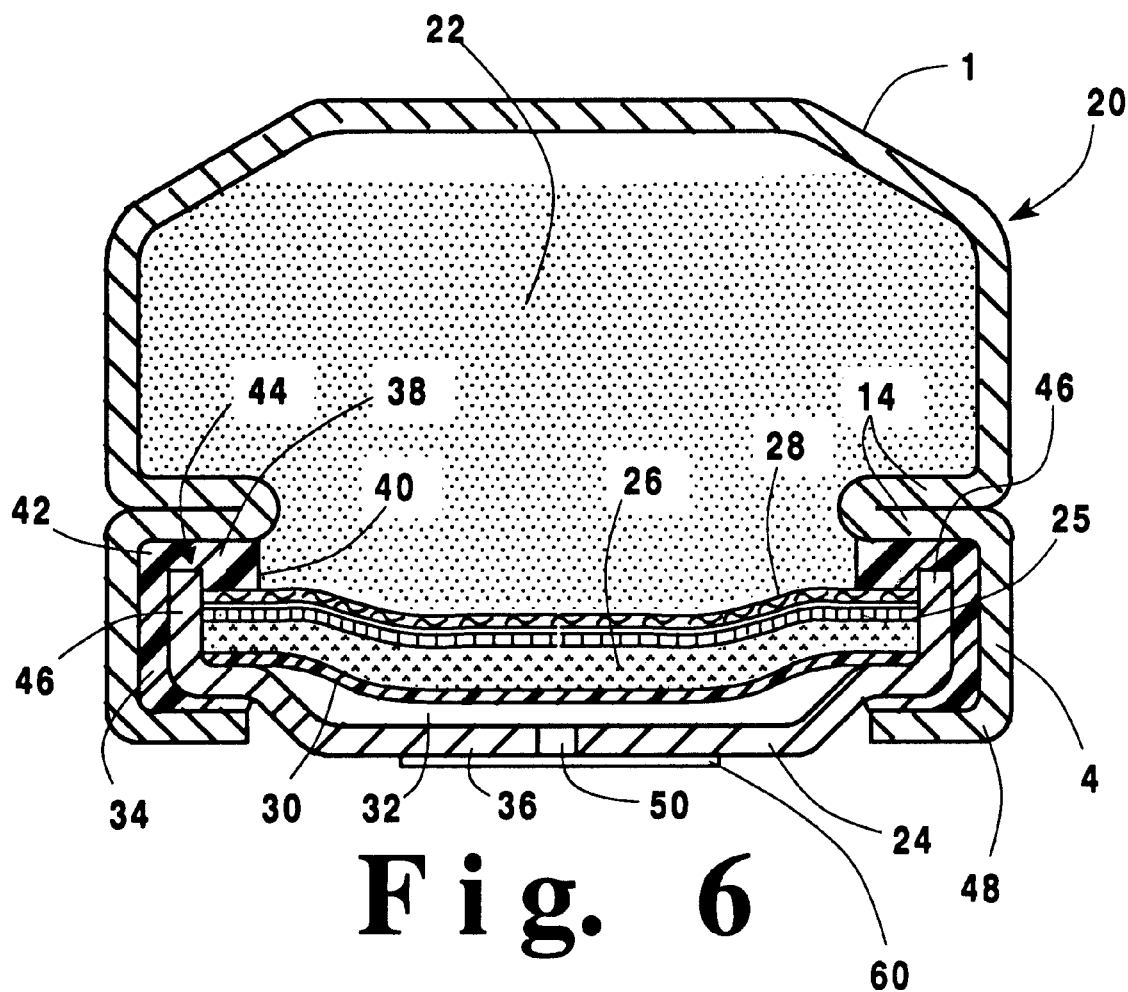
FIG. 6 is a cross-sectional view of at shed air depolarized cell showing the cup of FIG. 5 with a gasket, negative electrode, electrolyte and a can with a positive electrode after the wall of the cup was crimped to provide a sealed cell.

FIG. 1 shows a circular cup 1 having a base 2 and an upstanding peripheral wall 4 defining an opening 6. The cup 1 could be formed by drawing a blank conductive disc using a concentral forming punch and a draw die. FIG. 2 shows cup 1 formed as shown in FIG. 1 followed by a reverse redraw operation to fold the portion 8 of the wall defining the opening on itself to produce a folded segment 10. FIG. 3 shows the cup 1 of FIG. 1 in which the folded segment 10 is folded back upon itself producing a three-folded segment 12. Forming a bead can be accomplished by bending inwardly the inner folded segment to form an inner fold 14 as shown in FIG. 4. The beaded area will help constrain the gasket of the cell as shown in FIG. 6. The bending of the inner fold 14 can be done to produce the desired bead 14 as shown in FIG. 5. As shown in FIG. 5, the outer diameter of the cup of FIG. 4 is reduced so that the upper section 16 of the cup will be in alignment with the remaining vertical portion of the peripheral wall 4. All identical parts shown in FIG. 1 through 6 will be identified with their respective members.

FIG. 6 shows an assembled cell 20 comprising the cup 1 containing the anode 22, and a can 24 containing an air electrode 26. The cell 20 also contains separator 28, nickel screen 25, air electrode 26, polytetrafluoroethylene (PTFE) layer 30, an air distribution membrane 32 and gasket 34. The cup 1 is identified with the same component parts as in FIG. 5. The can 24 is shown with a central outward shallow embossed section 36. As discussed above, the shallow embossed section 36 will serve to accommodate an oversize electrode 26 while also serving as a controlled gap for uniform air diffusion across the surface of the electrode. As shown in FIG. 6, gasket 34 has a base 38, an inner wall 40 and an outer wall 42 forming a groove 44 that accommodates the peripheral wall 46 of can 24. The beaded section 14 of cup 1 supports the base 38 of gasket 34 during the sealing operation of the cell 20. As discussed above, a ring or similar object could be disposed between inner wall 40 of gasket 34 and peripheral section of the separators 28 to secure the air electrode assembly during and after sealing of the cell. Alternatively, a separate ring or similar object could replace the inner wall of the gasket, or the inner wall of the gasket could be eliminated, with the base of the gasket making direct contact with the separator.

The air electrode 26 is shown in FIG. 6 with an outer diameter larger than the inner diameter of the peripheral wall 46 of can so that the air electrode 26 will be wedged within the can 24 and make excellent electrical contact with nickel screen 25. The shallow embossed section 36 will accommodate the oversized air electrode 26.

As shown in FIG. 6, the edge 48 of the wall 4 of the cup 1 is shown compressed against the electrically insulating gasket 34 between the cup 1 and the can 24 thereby forming a seal and an electrical barrier between the can 24 and the cup 1.

As shown in FIG. 6, hole 50 is punched into the bottom of can 24 to act as an air-entering port. A strip of tape 60 is shown to seal the bole 50 prior to use. The cell shown in FIG. 6 has the can 24 in electrical contact with electrode 26 and the cup 1 in electrical contact with electrode 22 and thus the terminals of the cell are at opposite ends.

The positive electrode 26, (air electrode), can comprise manganese dioxide, activated carbon, and electroconducting acetylene black, with further addition of polytetrafluoroethylene (PTFE) dispersion, to provide a mix that can be applied on a metallic screen. The layer of polytetrafluoroethylene covers the entire base of the can including the air distribution membrane. The negative electrode (anode) comprising zinc powder is placed in the cup and makes electronic contact with the cup. The negative electrode may comprise a mixture of zinc particles, electrolyte and organic compounds such as binders which make up the battery's negative electrode. The cup can be made from a trilaminate material comprising copper that has been laminated to the bare side of a nickel-clad steel strip. A nickel layer could be used to protect the exterior surface of the steel strip. Other laminated materials from which the cup may be made include: a bilaminate of copper on a stainless steel substrate or a laminate made from more than three layers. Round disks punched from this laminated metal strip can then be formed into a cup. The copper layer forms the inside surface of the cup and directly contacts the negative electrode mixture.

It is to be understood that modifications and changes to the preferred embodiment of the invention herein shown and described can be made without departing from the spirit and scope of the invention.

What is claimed:

1. A miniature galvanic cell comprising a first positive electrode a second negative electrode; a separator between said first electrode and said second electrode; an electrolyte; a two-part conductive housing containing said first electrode, said second electrode, said separator and said electrolyte, the first part of said housing being a can electrically connected to said first electrode and having a wall and an edge defining an opening, and the second part of said housing being a cup electrically connected to said second electrode and having an upstanding wall with an outer surface and an edge end defining an opening and having an inward beaded area at the vicinity of the open end of the cup, and an insulating gasket comprising a base member and at least one upstanding wall; wherein the edge of the can's wall is disposed against said gasket; one upstanding wall of said gasket is disposed between the wall of the can and the wall of the cup; the upstanding wall of the cup is radially outward of the upstanding wall of the gasket and the wall of the can; and the base member of said gasket is seated on the beaded area of the cup producing a sealed miniature galvanic cell.

2. The galvanic cell of claim 1 wherein the can has a bottom having an outward embossment at its central area.

3. The galvanic cell of claim 1 wherein the can is a cylindrical can having a peripheral upstanding wall with an inner upstanding surface and wherein the first electrode is a disc and the outer diameter of the disc is larger than the inside diameter of the inner upstanding wall of the can beyond the inward beaded area.

4. The galvanic cell of claim 2 wherein the can is a cylindrical can having a peripheral upstanding wall with an inner upstanding surface and wherein the first electrode is a disc and the outer diameter of the disc is larger than the inside diameter of the inner upstanding wall of the can beyond the inward beaded area.

5. The galvanic cell of claim 1 wherein the beaded area has a surface perpendicular to the wall of the cup and said surface is disposed nearer the open end of the cup and wherein the vertical height from the open end of the cup to the perpendicular beaded surface is between about 5% and about 40% of the vertical length of the upstanding wall of the cup measured from the open end of the cup.

6. The galvanic cell of claim 5 wherein the vertical height from the open end of the cup to the perpendicular beaded surface is between about 8% and about 30% of the vertical length of the upstanding wall of the cup, measured from the open end of the cup.

7. The galvanic cell of claim 5 wherein the can has a bottom having an outward embossment at its central area.

8. The galvanic cell of claim 5 wherein the can is a cylindrical can having a peripheral upstanding wall with an inner upstanding surface and wherein the first electrode is a disc and the outer diameter of the disc is larger than the inside diameter of the inner upstanding wall of the can beyond the inward beaded area.

9. The galvanic cell of claim 1 wherein the cell is an air depolarized cell.

10. The galvanic cell of claim 9 wherein the negative electrode comprises zinc.

11. The galvanic cell of claim 9 wherein the can has a bottom having an outward embossment at its central area.

12. The galvanic cell of claim 11 wherein the can is a cylindrical can having a peripheral upstanding wall with an inner upstanding surface and wherein the first electrode is a disc and the outer diameter of the disc is larger than the inside diameter of the inner upstanding wall of the can beyond the inward beaded area.

13. The galvanic cell of claim 12 wherein the beaded area has a surface perpendicular to the wall of the cup and said surface is disposed nearer the open end of the cup and wherein the vertical height from the open end of the cup to the perpendicular beaded surface is between about 5% and about 40% of the vertical length of the wall of the cup measured from the open end of the cup.

14. The galvanic cell of claim 1 wherein said gasket is made of a material selected from the group consisting of nylon, polytetrafluoroethylene, fluorinated ethylene-propylene, chlorotrifluoroethylene, perfluoro-alkoxy polymer, polyvinyls, polyethylene, polypropylene and polystyrene.

15. A process for assembling the components of a miniature cell into a two-part conductive housing in which one part is a cup and the other part is a can, comprising the steps:

a) forming a cup having a base member and peripheral wall defining an opening from a conductive sheet of material;

b) reforming and reversing the base of the cup of step a) to reverse a portion of the peripheral wall at the opening upon itself to produce a two member first segment;

c) reforming the cup of step b) to reverse a portion of the peripheral wall extending from the first segment upon itself to produce a three member second segment;

d) forming an internal bead on the wall of the cup comprising two members of the second segment disposed perpendicular to the peripheral wall and the third member of the second segment being the portion of the wall defining the opening and disposed parallel to the peripheral wall;

e) preparing an electrically insulating gasket;

f) preparing a conductive can with a peripheral wall having an edge defining an opening for the can;

g) placing the components of the miniature cell including a positive electrode and a negative electrode within the cup and the can and then placing the can into the cup so that the wall of the can is in parallel alignment with the wall of the cup, the gasket is disposed in physical contact between the wall of the cup and the wall of the can, and the gasket is seated on the internal bead of the wall of the cup, wherein the upstanding wall of the cup is radially outward of the upstanding wall of the gasket and the wall of the can; and, h) securing the cup, the gasket and the can so as to effectively seal the miniature cell and thereby electrically insulate the can from the cup.

16. The process of claim 15 wherein in step f) the can is formed with a bottom having an outward embossment at its central area.

17. The process of claim 16 wherein in step f) a positive electrode is disposed between the peripheral wall of the can, said can being a cylindrical can and wherein the outer diameter of the positive electrode disc is larger than the inner diameter of the wall of the can beyond the inward beaded area.

18. The process of claim 17 wherein the negative electrode comprises zinc and an electrolyte.

19. The process of claim 15 wherein the bead is formed so that it has a beaded surface perpendicular to the wall of the cup and said beaded surface is disposed nearer the open end of cup and wherein the vertical height from the open end of the cup to the perpendicular beaded surface is between about 5% and about 40% of the vertical length of the wall of the cup measured from the open end of the cup.

\* \* \* \* \*